Jan. 14, 1969 HANS-JOACHIM GRIESE 3,422,225
LOW NOISE CIRCUIT ARRANGEMENT FOR CAPACITIVE TRANSDUCER
Filed April 23, 1965 Sheet 1 of 4

INVENTOR
Hans Joachim Griese
BY
Michael J Striker
ATTORNEY

INVENTOR
Hans Joachim Griese
BY
ATTORNEY

INVENTOR

BY

ATTORNEY

INVENTOR
Hans Joachim Griese
BY
Michael J. Striker
ATTORNEY

United States Patent Office 3,422,225
Patented Jan. 14, 1969

3,422,225
LOW NOISE CIRCUIT ARRANGEMENT FOR CAPACITIVE TRANSDUCER

Hans-Joachim Griese, Isernhagen uber Hannover, Germany, assignor to Sennheiser Electronic, Bissendorf, Hannover, Germany Filed Apr. 23, 1965, Ser. No. 450,694
Claims priority, application Germany, Aug. 1, 1964, S 92,430/64
U.S. Cl. 179—1 8 Claims
Int. Cl. H04m *1/18;* H04m *1/19;* H03f *3/38*

ABSTRACT OF THE DISCLOSURE

The output voltage of a crystal controlled transistor oscillator is inductively coupled to a circuit comprising an inductor and two diodes series-connected across said inductor. The inductor is also coupled to the capacitive transducer, the capacitive transducer-inductor circuit having a resonant frequency equal to the oscillator frequency when no sound impinges upon the capacitive transducer. The phase angle between the oscillator output voltage induced in the inductor and the voltage across the inductor determines the conductivity of the diodes. A capacitor is charged from the common point of said diodes, the charging of said capacitor thus taking place at a frequency corresponding to the oscillator frequency and with a current amplitude corresponding to the phase angle. The transistor amplifier is provided to amplify the voltage across the capacitor. Negative feedback circuit coupled between the output of the transistor amplifier and the inductor includes adjustable components for selectively providing a negative feedback independent of frequency and a negative feedback dependent on frequency. A voltage stabilizing circuit for stabilizing the oscillator output voltage is shown. A circuit permitting adjustment of the inductive coupling between the output voltage of the oscillator and the inductor is shown.

The present invention relates to a low noise circuit arrangement for a capacitive transducer. More particularly, the invention relates to circuit arrangements for a capacitive transducer or capacitive microphone which provide substantially complete suppression of noise, static and the like.

Capacitive microphones generate undesirable noise, static or the like. Circuits for reducing or suppressing such noise are complex, complicated and voluminous and do not completely or fully suppress the noise. Unsuppressed noise in such circuits adversely affects the resolution, fidelity, and quality of reproduction. The noise, static and the like originate from the oscillator and from diode rectifiers in the circuit, as well as from the capacitive transducer or microphone itself. Microphones of the capacitive type having weak diaphragms or membranes are especially prone to produce noise and the like.

The principal object of the present invention is to provide a new and improved low noise circuit arrangement for a capacitive transducer.

An object of the present invention is to provide a low noise circuit arrangement for a capacitive transducer which substantially fully and completely suppresses noise, static and the like.

Another object of the present invention is to provide a low noise circuit arrangement for a capacitive transducer which is simple and compact and provides a high resolution, quality and fidelity of reproduction.

Another object of the present invention is to provide a low noise circuit arrangement for a capacitive transducer which permits stable operation.

Another object of the present invention is to provide a low noise circuit arrangement for a capacitive transducer which is inexpensive to manufacture.

Another object of the present invention is to provide a low noise circuit arrangement for a capacitive transducer which is simple and easy to operate.

Another object of the present invention is to provide a low noise circuit arrangement for a capacitive transducer which substantially suppresses noise, static and the like from any source in the circuit, including the oscillator, rectifier diodes.

In accordance with the present invention, a low noise circuit arrangement for a capacitive transducer which converts sound waves impinging thereupon into corresponding electrical variations comprises a crystal-controlled transistor oscillator comprising means for providing an oscillator output voltage at an oscillator frequency. A resonant circuit comprises an inductor and a pair of semiconductor diodes having a very steeply rising current-voltage characteristic in the forward range connected in series with the inductor in closed loop configuration said closed-loop configuration being inductively coupled to said capacitive transducer. The diodes of the resonant circuit are connected to each other by a substantial short-circuit. The resonant circuit has a frequency substantially equal to the oscillator frequency when zero sound waves impinge upon the capacitive transducer. The output voltage of the oscillator is inductively coupled to the inductor of the resonant circuit. The voltage across the inductor and the oscillator output voltage induced in the inductor determine the conductivity of the diodes, thereby changing the capacitor voltage corresponding to the sound waves with substantially full noise suppression. When zero sound waves impinge upon the capacitive transducer, the voltage across the inductor of the resonant circuit is 90 degrees out of phase with the oscillator output voltage induced in the inductor and the phase difference between the voltage across the inductor and the induced oscillator output voltage varies with sound waves impinging upon the capacitive transducer. A transistor amplifier is coupled to the capacitor for amplifying the voltage across the capacitor.

In an embodiment of the circuit arrangement of the present invention, a negative feedback circuit is coupled between the output of the transistor amplifier and the inductor of the resonant circuit and includes adjustable components for selectively providing a negative feedback which is substantially independent from frequency and a negative feedback which is dependent upon frequency.

In an embodiment of the circuit arrangement of the present invention, the oscillator includes a voltage stabilizing circuit for stabilizing the oscillator output voltage. The voltage stabilizing circuit comprises a Zener diode and a silicon dode connected across the means for providing an oscillator output voltage.

In an embodiment of the circuit arrangement of the present invention, a voltage stabilizing circuit comprising a Zener diode and a silicon diode is connected across the capacitive transducer for stabilizing the voltage across the capacitive transducer.

In an embodiment of the circuit arrangement of the present invention, the output voltage of the oscillator is adjustably inductively coupled to the inductor of the resonant circuit. The adjustable coupling is accomplished either by a coupling loop having a first winding inductively coupled to the oscillator output voltage means of the oscillator, a second winding inductively coupled to the inductor of the resonant circuit and a variable resistor connected in series with and between the first and second windings, or is accomplished by a winding inductively coupled to the inductor of the resonant circuit and a variable resistor connected in series with the winding, the series connection of the winding and the variable resistor being connected across at least a portion of the oscillator output voltage means of the oscillator.

Further, it is possible to compensate for changes in capacitance of the capacitive transducer caused, for example, by temperature changes, by including variable corrective capacitance means in said negative feedback circuit in such a manner that a change in transducer capacitance at zero audio input is compensated by an opposing change in the capacitance of said variable corrective capacitance means.

In order that the present invention may be readily carried into effect, it will now be described with reference to the accompanying drawings, wherein.

In the figures, the same components are identified by the same reference numerals.

Figure 1:
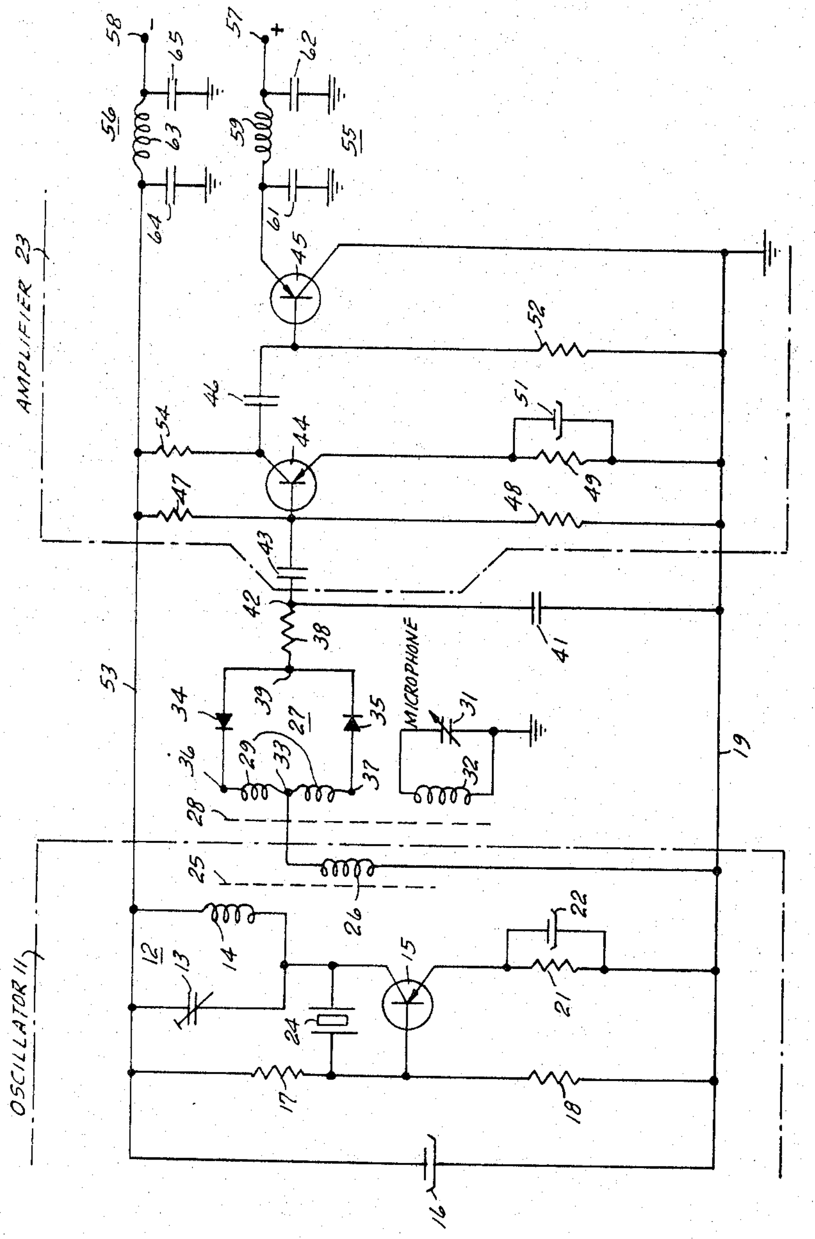
FIG. 1 is a circuit diagram of an embodiment of the circuit arrangement of the present invention.

In the embodiment of FIG. 1, an oscillator 11 comprises a tuned or tank circuit 12 having a variable tuning capacitor 13 and a tuning inductor 14. The oscillator 11 includes a transistor 15 which is supplied with suitable DC voltage by a capacitor 16 and a voltage divider having resistors 17 and 18 connected in series with each other, the series connection 17, 18 being connected across the capacitor 16.

The transistor 15 comprises an emitter electrode connected to a common ground line 19, to which one end of the resistor 18 is connected, via a resistor 21 and a capacitor 22 connected in shunt across the resistor 21. The transistor 15 also comprises a base electrode connected to a common point on the line joining the resistor 17 and 18 and a collector electrode connected to a common point on the line joining the capacitor 13 and the inductor 14 of the tank 12.

The capacitor 16 also supplies a suitable DC voltage for the transistors of the following amplifier 23. The oscillator 11 is controlled in frequency by a crystal 24 connected between the collector electrode and the base electrode of the transistor 15. The inductor 14 of the tank 12 is positioned in operative proximity with a first high frequency magnetic core 25. The first core 25 may comprise, for example, ferrite. A coupling winding 26 is positioned in operative proximity with the first core 25. The inductor 14 and the coupling winding 26, or either of them, may, for example, be positioned in the first core 25. The high frequency output voltage of the oscillator 11 is provided at the coupling winding 26.

The tank 12 of the oscillator 11 is inductively coupled to a resonant circuit 27 as well as to the coupling winding 26. A second high frequency magnetic core 28 is positioned in operative proximity with inductor 29 of the resonant circuit 27. The frequency of the resonant circuit 27 is determined by the inductor 29 thereof and by a variable capacitor 31 and inductor 32 connected in a closed loop with each other. The inductor 32 is positioned in operative proximity with the second core 28 and is inductively coupled with the inductor 29.

The variable capacitor 31 represents a capacitive transducer unit such as, for example, a microphone, which varies in capacitance in accordance with variation in air pressure produced by soundwaves impinging upon it. The inductor 29 has a center tap 33 to which one end of the coupling winding 26 is electrically connected. The inductor 29 is connected in a closed loop with a pair of semiconductor diodes 34, and 35, the anode of the diode 35 being connected to the end 37 of said inductor, the cathode of said diode 35 being connected to the anode of the diode 34, and the cathode of said diode 34 being connected to the end 36 of the said inductor to form the resonant circuit 27.

The inductor 29 and the capacitor 31 are mutually tuned in a manner whereby the resonant frequency of the resonant circuit 27 equals the resonant frequency of the tank 12 when the variation of the capacitance of the capacitor 31 is zero, so that said resonant frequency of said resonant circuit 27 corresponds to the frequency of the crystal 24 of the oscillator 11. A resistor 38 is connected in series between a common point 39 on the line joining the diodes 34 and 35 and the amplifier 23. A capacitor 41 is connected between a common point 42 on the line joining the resistor 38 and the amplifier 23 and the common ground line 19.

In accordance with the present invention, the resonant circuit 27 functions as a switch to control the high frequency output voltage of the oscillator 11. The semiconductor diodes 34 and 35 are preferably silicon diodes and the line joining the cathode of the diode 35 to the anode of the diode 34 is of sufficiently low resistance so that it functions essentially as a short-circuit. The output voltage at the point 42 is proportional to the variation of the capacitance of the capacitor 31 and is thus proportional to the sound impinging on the capacitive transducer or microphone. This output voltage is applied to the amplifier 23 via a coupling capacitor 43.

The amplifier 23 may comprise any suitable amplifier circuit, and in the embodiment of FIG. 1, said amplifier comprises a first transistor 44 coupled to a second transistor 45 via a coupling capacitor 46. Each of the first and second transistors 44 and 45 has an emitter electrode, a base electrode and a collector electrode. The coupling capacitor 43 is connected to the base electrode of the first transistor 44 and the collector electrode of said first transistor is connected to the base electrode of the second transistor 45 via the coupling capacitor 46.

The first transistor 44 is connected in grounded emitter configuration and the second transistor 45 is connected in grounded collector configuration. The base electrode of the first transistor 44 is connected to a common point on a line joining resistors 47 and 48 which are connected to each other in series and function as a voltage divider. The emitter electrode of the first transistor 44 is connected to the common ground line 19 via a resistor 49 and a capacitor 51 connected in shunt across said resistor.

The base electrode of the second transistor 45 is connected to the common ground line 19 via a resistor 52. The collector electrode of the first transistor 44 is connected to supply line 53 via a resistor 54. The resistor 17 and the capacitor 13 and inductor 14 of the tank 12 are also connected to the supply line 53, as is the resistor 47 of the amplifier 23. A first output filter 55 is connected to the emitter electrode of the second transistor 45 and a second output filter 56 is connected to the collector electrode of the first transisor 44 via the resistor 54. The amplifier voltage of the amplifier 23 is provided at output terminals 57 and 58.

Each of the filters 55 and 56 is a high frequency filter and each is a pi filter comprising a series connected inductor and parallel connected capacitors. The first filter 55 comprises an inductor 59 and capacitors 61 and 62. The second filter 56 comprises an inductor 63 and capacitors 64 and 65.

The voltage across the inductor 29 of the resonant circuit 27, that is, the voltage of the points 36 and 37 of said resonant circuit, is hereinafter referred to as V1, and the high frequency voltage applied to said inductor by the oscillator 11 is hereinafter referred to as V2. Since the resonant frequency of the resonant circuit 27 equals the resonant frequency of the tank 12 when the variation of the capacitance of the capacitor 31 is zero, the voltage V1 is 90 degrees out of phase with the voltage V2. The high frequency voltage V2 from the oscillator is applied via the coupling winding 26. Thus, there is no voltage across the capacitor 41, when no sound impinges on the capacitive microphone. That is, the capacitor 41 is not then charged.

If sound waves impinge on the capacitive transducer unit to vary the capacitance of the capacitor 31, the amplitude of the voltage V1 does not vary, but its phase relative to the voltage V2 varies. The frequency of the sound waves is low relative to the frequency of the oscillator output voltage. The phase angle between the voltages V1 and V2 becomes smaller or larger than 90 degrees, depending upon whether the frequency of the resonant circuit 27 becomes higher or lower relative to the frequency of the tank 12 under the influence of the variation of the capacitance of the capacitor 31 or capacitive transducer unit.

The diode 35 of the resonant circuit 27 conducts current surges or pulses at a repetition rate corresponding to the frequency of the oscillator 11 and having an amplitude corresponding to the phase angle between the voltages V1 and V2. These pulses are supplied to the capacitor 41 and correspond to the low frequency variation of sound impinging on the capacitive transducer unit. The duration of the pulses depends upon the voltage V2. The close inductive coupling between the oscillator 11 and the resonant circuit 27 maintains a small coupling impedance between said oscillator and said resonant circuit. The voltage across half the inductor 29 between the center tap 33 and the end 37, which is equal to V½ and which is applied in series with the voltage V2 is added to said voltage V2. The resistor 38 prevents overcharging or overloading of the capacitor 41. The circuit arrangement of FIG. 1 provides a large charging or loading capacitor 41 and provides a high resolution, high quality, high fidelity output voltage with substantially full suppression of noise when sound waves impinge upon the microphone or capacitor 31.

The voltage V1 across the inductor 29 of the resonant circuit 27 may be reduced in magnitude and the high resolution and fidelity of the output voltage of the circuit arrangement will still be maintained. In the circuit arrangement of FIG. 1 there is substantially no noise, static or the like in the voltage at the point 39 when there is no sound impinging upon the capacitive transducer unit. The silicon diodes 34 and 35 function to limit or level off any noise, static or the like in the high frequency oscillator output voltage. Failure to limit the noise amplitudes would permit considerable noise to appear in the resonant circuit 27.

In the circuit arrangement of FIG. 1, the blocking noise, static or the like of the diodes 34 and 35 is suppressed to the point of substantial elimination. Diodes have a blocking static, noise or the like, which may be considerably reduced by providing a low resistance load therefor. Thus, in the resonant circuit 27, the doides 34 and 35 are connected in series and mutually aiding relation with regard to the voltage V1 across the inductor 29, but said diodes are connected in mutually opposing relation with regard to the voltage V2 applied from the oscillator 11.

If a voltage V2 is applied to the diodes 34 and 35, such voltage biases the diode 35 in its conducting direction and said diode conducts current pulses to the capacitor 41. The same voltage biases the diode 34 in its blocking or non-conducting direction. In such condition, the diode 34 may be considered a source of noise or static having a high resistance which is short-circuited by the very small forward or conducting resistance of the diode 35. Thus, the blocking noise, static or the like of the diode 34 is substantially wholly suppressed.

Since the blocking voltage upon the non-conducting diode 34 is substantially equal to the forward or conducting resistance of the conducting diode 35, silicon diodes are preferably utilized, because they have a very steeply rising current-voltage characteristic in the forward or conducting range and they thus have a small forward or conducting voltage and a very small forward or conducting resistance.

Although the high frequency voltage V1, across the inductor 29 and between the points 36 and 37, may be reduced in magnitude, the circuit arrangement may be made to provide a reduced high frequency voltage across the inductor 32 and capacitor 31. This is especially important for a capacitive transducer unit which has a pressure responsive element, such as a diaphragm or membrane, which is very lightly tensioned. The capacitance of the capacitive transducer unit or capacitor 31 changes due to the influence of the high frequency voltage V1 and produces a change in the frequency of the resonant circuit 27.

The forces acting on the membrane, diaphragm or the like of the capacitive transducer unit are proportional to the square of the voltage, so that a small magnitude voltage at such transducer unit is of considerable advantage. The diodes 34 and 35 assist in maintaining a small magnitude voltage by limiting or leveling off the high frequency voltage from the oscillator 11. The limitation of the high frequency voltage and the small magnitude of high frequency voltage at the capacitive transducer unit maintain the capacitance of said capacitive transducer substantially constant.

Figure 2:
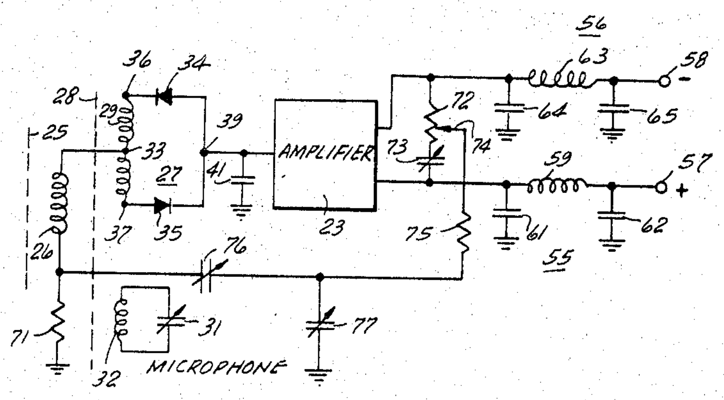
FIG. 2 is a circuit diagram showing negative feedback circuits connected from the output to the input of the amplifier of FIG. 1, to prevent overdriving of said amplifier.

FIG. 2 is another embodiment of the circuit arrangement of the present invention, wherein the same components as utilized in the embodiment of FIG. 1 are indicated by the same reference numerals and function in the same manner. The resistor 38 of FIG. 1 is eliminated in FIG. 2, wherein the point 39 is connected directly to the amplifier 23. A resistor 71 is connected between the coupling winding 26 and a point at ground potential. The resistance of the resistor 71 of the embodiment of FIG. 2 has essentially the same effect as the resistance of the resistor 38 of the embodiment of FIG. 1.

The resistor 71 also functions, in the embodiment of FIG. 2, as a negative feedback coupling resistor in a negative feedback circuit from the output of the amplifier 23 to the resonant circuit 27. The amplifier 23 is shown in block form to maintain the clarity of illustration and is the same amplifier circuit as in the embodiment of FIG. 1. The negative feedback circuit provides a low frequency feedback.

The negative feedback circuit comprises a variable resistor 72 connected in series with a variable capacitor 73 between the output lines of the amplifier 23. The resistance varying arm 74 of the variable resistor 72 is connected to a common point in the line joining the coupling winding 26 and the resistor 71 via a resistor 75 and a variable capacitor 76 connected in series with each other. A variable capacitor 77 is connected between a common point on the line joining the resistor 75 and the variable capacitor 76 and a point at ground potential. The variable components 72, 73 and 76 and 77, may be adjusted to provide a negative feedback which is substantially independent from frequency and may be adjusted to provide a negative feedback which is dependent upon frequency. Adjustment of the variable resistor 72 and the variable capacitor 73 permits variation of a frequency-independent negative feedback within determined limits. It is the function of the frequency-independent feedback circuits to prevent overdrive of the amplifier when a very loud audio signal follows, for example, a pianissimo passage. The frequency-dependent feedback may be adjusted to achieve a desired recording characteristic.

Figure 3:
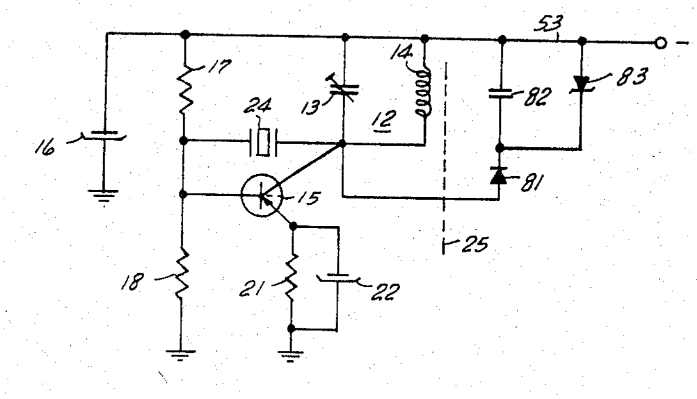
FIG. 3 is a circuit diagram showing a voltage stabilization circuit for the oscillator.

In the embodiment of FIG. 3, the high frequency output voltage of the oscillator 11 is stabilized and the noise, static or the like of said oscillator output voltage is thereby considerably reduced. With the exception of the voltage stabilizing circuitry, the embodiments of FIGS. 1 and 3 are the same.

The voltage stabilizing circuitry of FIG. 3 comprises a diode 81 connected in series with a capacitor 82. The series connection of the diode 81 and the capacitor 82 is connected in parallel with the tank 12 of the oscillator. The diode 81 is preferably a silicon diode. A Zener diode 83 is connected between a common point in the line joining the diode 81 and the capacitor 82 and the voltage supply line 53. The capacitor 82 is charged to the output voltage of the oscillator. The Zener diode 83, connected in parallel with the capacitor 82 stabilizes the voltage across said capacitor to a determined magnitude and cuts off, limits or levels off all voltage magnitudes above the determined magnitude.

Figure 4:
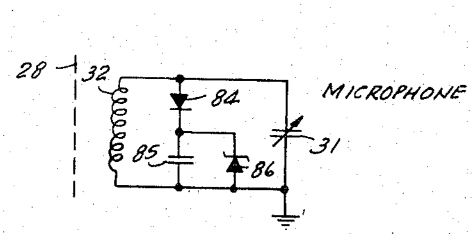
FIG. 4 is a circuit diagram of an embodiment of a voltage stabilizing circuit which may be utilized in the circuit arrangement of the present invention.

FIG. 4 is a voltage stabilizing circuit for high frequency voltage at the capacitive transducer unit or capacitor 31. The embodiments of FIGS. 1 and 4 are the same, except for the voltage stabilizing circuitry connected between the inductor 32 and the capacitor 31. The voltage stabilizing circuitry of FIG. 4 comprises a diode 84 connected in series with a capacitor 85. The series connection of the diode 84 and the capacitor 85 is connected in parallel with each of the capacitive transducer unit or capacitor 31 and the inductor 32. The diode 84 is preferably a silicon diode. A Zener diode 86 is connected between a common point in the line joining the diode 84 and the capacitor 85 and a point at ground potential. The voltage stabilizing circuit of FIG. 4 stabilizes the high frequency voltage at the capacitive transducer or microphone and thereby considerably reduces variations in capacitance of said microphone resulting from high frequency voltages.

Figure 5:
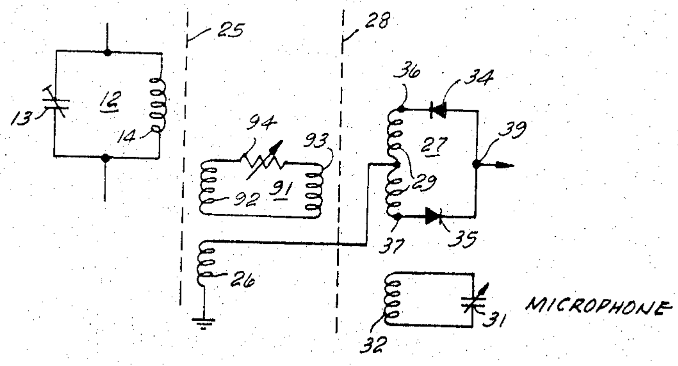
FIG. 5 is a circuit diagram showing additional coupling between the oscillator circuit and the resonant circuit.

In the embodiment of FIG. 5 an additional inductive coupling is provided between the tank 12 of the oscillator 11 and the resonant circuit 27. The additional inductive coupling functions as a high frequency coupling and is the only departure in the embodiment of FIG. 5 from the embodiment of FIG. 1. As hereinbefore indicated, when the variation of the capacitance of the capacitor 31 is zero, the frequency of the resonant circuit 27 equals the frequency of the tank 12 of the oscillator 11. That is, when no sound impinges upon the capacitive transducer or microphone the frequency of the resonant circuit 27 is the same as the oscillator frequency. Also, as hereinbefore indicated the impinging of sound waves on the microphone produces a variation in phase of the voltage of the resonant circuit without substantially varying the amplitude of such voltage.

The capacitance of the capacitive transducer is affected by many conditions such as, for example, a change in environmental temperature. If such a change in the capacitance of the microphone occurs, the frequency of the resonant circuit 27 becomes greater or smaller than the oscillator frequency when no sound impinges upon the microphone. This leads to considerable non-linear distortions when sound waves impinge upon the microphone.

In accordance with the embodiment of FIG. 5 of the present invention, the intensity or degree of the inductive coupling between the tank 12 and the resonant circuit 27 may be varied or regulated to vary the frequency curve of said resonant circuit to provide a linear response when no sound waves impinge upon the microphone and when sound waves impinge upon the microphone and thereby to avoid non-linear distortions. Regulation of the inductive coupling between the oscillator 11 and the resonant circuit 27 is very difficult to accomplish by variation or regulation of the ferrite cores 25 and/or 28. Contributing causes of the difficulty are the compactness and nature of the housing, structure and circuit of the arrangement.

The regulation of the inductive coupling between the oscillator 11 and the resonant circuit 27 is accomplished in the embodiment of FIG. 5 without difficulty. The embodiments of FIGS. 1 and 5 are the same except for the additional coupling loop 91. The coupling loop 91 comprises a first coupling winding 92 positioned in close operative proximity with the first ferrite core 25, A second coupling winding 93 is positioned in close operative proximity with the second ferrite core 28. The first and second coupling windings 92 and 93 are connected in series with a variable resistor 94 in the closed additional coupling loop 91. Various known types and arrangements of cores may be utilized in place of the first and second cores 25 and 28. The cores 25 and 28 may, for example, be positioned in perpendicular relation to each other. The embodiment of FIG. 5 provides direct and variable inductive coupling in the limited space of a compact structure or housing and thereby avoids non-linear distortions.

Figure 6:
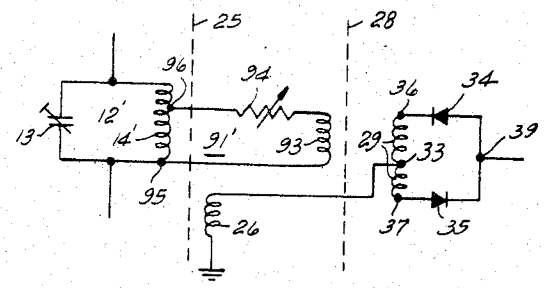
FIG. 6 is a variation of the circuit of FIG. 5 in which one winding is eliminated.

FIG. 6 is a modification of the embodiment of FIG. 5 in which the first coupling winding 92 is eliminated. The tank 12' comprises the variable capacitor 13 and an inductor 14' having an end tap 95 and an intermediate tap 96. The additional coupling loop 91' comprises the coupling winding 93 and the variable resistor 94, but in place of the coupling winding 92, utilizes the portion of the inductor 14' of the tank 12' between the end and intermediate taps 95 and 96. The series connection of the variable resistor 94 and the coupling winding 93 is thus connected at one end to the end tap 95 and at the other end to the intermediate tap 96. The operation of the modification of FIG. 6 is the same as that of the embodiment of FIG. 5.

Figure 7:
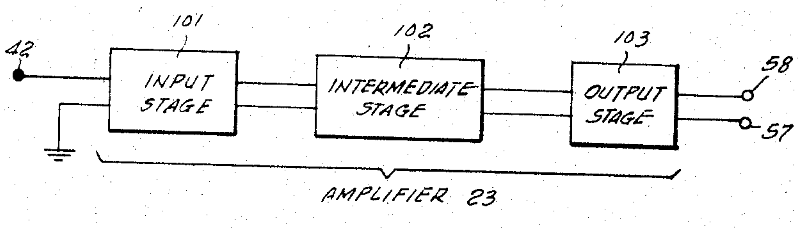
FIG. 7 is a block diagram of an amplifier which may be utilized with the circuit arrangement of the present invention.

FIG. 7 is a block diagram of an amplifier which may be utilized with the circuit arrangement of the present invention. The amplifier 23 of FIG. 7 comprises an input stage 101, an intermediate stage 102 and an output stage 103. The actual circuitry of the amplifier 23 may comprise that shown in FIG. 1.

Figure 8:
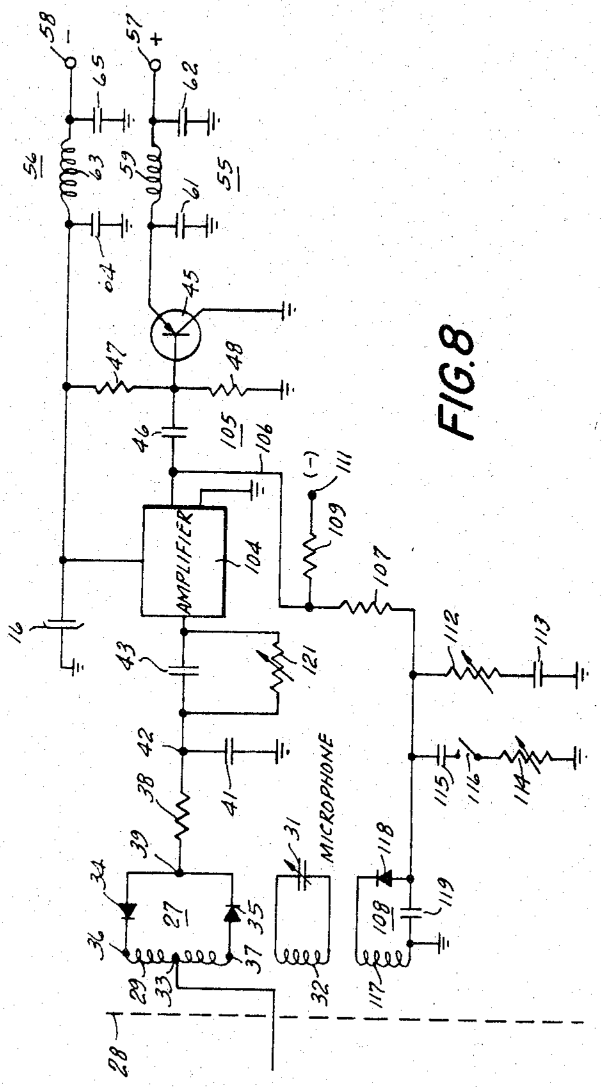
FIG. 8 is a circuit diagram showing a feedback circuit for compensating for changes in transducer capacitance.

FIG. 8 is another embodiment of the circuit arrangement of the present invention. The embodiment of FIG. 8 differs from the embodiment of FIG. 1 in that FIG. 8 comprises a negative feedback circuitry, which negative feedback circuit is different from the feedback circuit shown in FIG. 2. In the embodiment of FIG. 8, the amplifier is essentially similar to the amplifier 23 of FIG. 1 except that it is illustrated in two stages 104 and 105.

The first amplifier stage 104 functions as a DC amplifier and an AC amplifier. The output of the first amplifier stage 104 is coupled to the second transistor 45 via the coupling capacitor 46. A common point on the line joining the coupling capacitor 46 and the base electrode of the second transistor 45 is connected to a common point on the line joining the resistors 47 and 48 of the voltage divider comprising such resistors.

A DC and low frequency negative feedback signal is derived from the output of the first amplifier stage 104 and is supplied through a feedback line 106 and a feedback resistor 107 to a closed loop feedback coupling circuit 108. A resistor 109 is connected between a point on the feedback line 106 and a negative voltage terminal 111. A variable resistor 112 is connected in series with a capacitor 113 between a common point on the line joining the resistor 107 and the feedback coupling circuit 108 and a point at ground potential. A variable resistor 114 is connected in series with a capacitor 115 through a switch 116 and the series connection is connected between a common point on the line joining the resistor 107 and the feedback coupling circuit 108 and a point at ground potential.

The closed loop feedback coupling circuit 108 comprises a feedback coupling winding 117, a high capacitance diode 118 and a blocking capacitor 119 connected in series with each other in the loop. The loop 108 is grounded at a common point on the line between the feedback coupling winding 117 and the blocking capacitor 119. The biasing voltage applied to the high capacitance diode 118 is provided by the voltage source 111 via the resistors 109 and 107. The feedback coupling winding 117 is positioned in operative proximity with the ferrite core 28 and is inductively coupled to the inductor 29 of the resonant circuit 27 as is the inductor 32.

The capacitance of the high capacitance diode 118 affects the frequency of the resonant circuit 27 via the feedback coupling winding 117 in parallel relation to the capacitance of the capacitive transducer unit or variable capacitor 31. Thus, the capacitance of the high capacitance diode 118 as well as the capacitance of the capacitor 31 determines the frequency of the resonant circuit 27. When no sound impinges on the capacitive transducer or capacitor 31, the frequency of the resonant circuit 27 is the same as the frequency of the oscillator 11.

Although no sound waves impinge upon the capacitive transducer, the capacitance of the capacitor or capacitive transducer 31 may increase, as hereinbefore explained. This varies the frequency of the resonant circuit 27. The feedback signal in the feedback line 106 then contains DC components having polarities which bias the high capacitance diode 118 to provide a decreased capacitance and thereby corrects the frequency of the resonant circuit 27.

A variable resistor 121 is connected in shunt across the coupling capacitor 43. The variable resistor 121 functions to vary or regulate the magnitudes of the DC components in the feedback signal. Suitable adjustment of the time constant of the series connected variable resistor 112 and capacitor 113 permit variation or regulation of the AC feedback signal, within determined limits, substantially independently from the frequency. If the switch 116 is closed, the low frequency feedback signal may be varied or regulated, within determined limits, in dependence upon the frequency. The time constant of the series connected variable resistor 114 and capacitor 115 determines such operation. The regulation or variation components and aspects of the embodiment of FIG. 8 may vary in any number of ways, the illustrated components being merely exemplary.

The whole or any portion of the circuit arrangement such as, for example, the amplifier, may be housed in the microphone housing.

While the invention has been described by means of specific examples and in specific embodiments, I do not wish to be limited thereto, for obvious modifications will occur to those skilled in the art without departing from the spirit and scope of the invention.

What I claim is:

1. A low noise circuit arangement for a capacitive transducer for converting sound waves impinging thereupon into corresponding electrical variations, comprising, in combination, oscillator means for providing an oscillator output voltage at an oscillator frequency a resonant circuit inductively coupled to said capacitive transducer, said resonant circuit comprising an inductor and diode means including a pair of semi-conductor diodes connected in series with said inductor and connected to each other by a substantial short-circuit, said resonant circuit also having a frequency substantially equal to said oscillator frequency when zero sound waves impinge upon said capacitive transducer; means inductively coupling said oscillator output voltage to the inductor of said resonant circuit; and a capacitor connected to said resonant circuit, the voltage across said inductor in said arrangement determining the conductivity of said diode means, thereby charging said capacitor with a signal corresponding to said sound waves and having substantially zero noise component.

2. A low noise circuit arrangement as claimed in claim 1, wherein when zero sound waves impinge upon said capacitive transducer the voltage across said inductor is 90° out of phase with the oscillator output voltage, the phase difference between said voltage across said inductor and said oscillator output voltage varying with sound waves impinging upon said capacitive transducer.

3. A low noise circuit arrangement as set forth in claim 1, wherein said oscillator is crystal-controlled.

4. A low noise circuit arrangement as set forth in claim 2, wherein said diode means comprise a pair of semiconductor diodes having a very steep current-voltage characteristic in the forward direction.

5. A low noise circuit arrangement as set forth in claim 2, also comprising transistor amplifier means having an amplifier input coupled to said capacitor, for amplifying the voltage across said capacitor; an amplifier output; and negative feedback means coupled between said amplifier output and said amplifier input.

6. A low noise circuit arrangemnet as set forth in claim 5, wherein said negative feedback means include adjustable means for selectively providing a first negative feedback substantially independent of frequency, and a second negative feedback which is dependent on frequency.

7. A low noise circuit arrangement as set forth in claim 5, also comprising variable corrective capacitance means, inductively coupled to said resonant circuit; and means for varying the capacitance of said variable corrective capacitance means as a function of the voltage across said capacitor, in such a manner that the resonant frequency of said resonant circuit when no sound waves impinge upon said capacitive transducer, will remain equal to said oscillator frequency, in spite of unwanted variations of the capacitance of said capacitive transducer.

8. A low noise circuit arrangement as set forth in claim 7, wherein said variable corrective capacitance means comprise a high capacity diode having a capacitance which varies as a function of a diode biasing voltage; and wherein said means for varying said variable corrective capacitance means comprise direct current negative feedback means responsive to said amplifier output and adapted to change said diode biasing voltage in such a manner that a change in the capacitance of said high capacitance diode will compensate for undesired changes in the capacitance of said capacitive transducer.

References Cited

UNITED STATES PATENTS

| | | | |
|---|---|---|---|
| 2,493,819 | 1/1950 | Harry | 179—106 |
| 2,683,861 | 7/1954 | Veirling et al. | 179—106 |
| 3,206,696 | 9/1965 | Wright | 330—109 |
| 3,218,575 | 11/1965 | Wittman | 330—109 |
| 3,239,776 | 3/1966 | Shaw | 330—109 |
| 3,310,628 | 3/1967 | Cragg et al. | 179—1 |

OTHER REFERENCES

Morgan, Abstract 741,080, Class 179—1, Sept. 20, 1949.

KATHLEEN H. CLAFFY, *Primary Examiner.*

R. P. TAYLOR, *Assistant Examiner.*

U.S. Cl. X.R.

330—10